March 26, 1940. J. E. MITCHELL 2,194,462
BRUSH FOR USE WITH COTTON RECLAIMING SAW CYLINDERS
Filed Jan. 20, 1939

INVENTOR:
JOHN E. MITCHELL,
By Bruce D. Elliott
ATTORNEY.

Patented Mar. 26, 1940

2,194,462

UNITED STATES PATENT OFFICE 2,194,462

BRUSH FOR USE WITH COTTON RECLAIMING SAW CYLINDERS

John E. Mitchell, Dallas, Tex.; John E. Mitchell, Jr., Orville Mitchell, and Donald Mitchell, executors of said John E. Mitchell, deceased Application January 20, 1939, Serial No. 252,008

5 Claims. (Cl. 19—35)

The general object of this invention is to improve the reclaiming element of a cotton cleaning and reclaiming machine of the general type shown in my prior Patent No. 1,613,242, dated January 4, 1927, and is directed particularly to providing an improvement in the brush which co-operates with the reclaiming saw cylinder in forcing cotton into engagement with the teeth of the cylinder while permitting hulls passing between the brush and the cylinder to be thrown out by centrifugal action from the cylinder.

Heretofore, the brushes used in this type of machine have been composed of hog bristles or horsehair, and certain serious disadvantages have been noted as resulting from the use of these brushes which, prior to this invention, it has not been found possible to avoid, in a practical manner, by the use of any other means, or of any other type of brush. The most pronounced of these disadvantages I consider it desirable to set forth briefly, in order that the purpose and advantages of the present invention may be better understood.

After more or less extended use of brushes made from commercial animal bristles, it has been found that they gradually become permanently set or curved in the direction of rotation of the saw cylinder, which makes it necessary to occasionally reverse them in order to make the brushes effective in brushing the small locks of cotton onto the saw teeth.

Another objection to the use of horsehair, or other kinds of bristle brushes, is that they are often damaged, or eaten off by rats during the winter months when the gin plant is not in operation.

Still another objection to the use of bristle brushes is that they are subject to damage in operation by fire, which often occurs from the carelessness of workmen in dropping matches into the cotton, which are ignited in passing through the machine and set fire to some of the hulls.

In my patent aforesaid, I have suggested the use of flat spring fingers, and have illustrated such fingers, or yielding members, in Fig. 2 of the drawing. The use of spring fingers as a substitute for bristle brushes was found to be impracticable, however, especially in the fact that they are far less efficient for the purpose intended than bristle brushes, as indicated in the specification of said patent.

In order, therefore, to overcome the disadvantages incident to the use of bristle brushes, while preserving the advantage of the brush construction, I conceived the idea of using relatively fine, tempered-steel wires instead of horsehair, or other animal bristles, in the construction of the brushes, and as the modulus of elasticity of such wires is greater than that possessed by bristles, they were found to be quite an improvement over the latter. Notwithstanding, it was discovered that if the wires used were of the same length as the bristles formerly employed they, too, were liable to become permanently set away from the reclaiming cylinder by being bent beyond their limit of elasticity by foreign substances carried beneath them by the teeth of the reclaiming cylinder.

It now became apparent that the solution of the problem lay in using brushes having wires of such length that their elasticity of flexure would be preserved under any strain, or bending pressure, exerted against their free ends in the operation of the machine, and which would be capable of exerting the requisite degree of pressure at such ends on the cotton passed under them by the reclaiming cylinder. And again, the length of these wires or, at least, their minimum effective length, was found to be ascertainable by relating such length to a certain constant furnished by the machine itself. This may be explained by stating that the reclaiming cylinder works only on products, such as hulls and small locks of cotton, which escape through an opening, or gap, provided for this purpose at the rising side of the main extracting cylinder, and which is normal to all machines of this character. It is obvious that the width of this gap limits the size of any foreign substance, such as a stone, for example, that may pass through the same; hence it is only necessary that the length of the wires composing the brush should be considerably longer that the distance represented by the width of the discharge gap. The length of the wires to be used in any given case cannot be definitely stated, as much depends upon the judgment and experience of the manufacturer derived from observation of the work of the machine over an extended period of time and with various varieties and conditions of cotton. In general, however, it may be stated that if the discharge gap through which the products to be treated by the reclaiming cylinder pass is, say, two inches in width, the wires of the brush co-operating with the cylinder should be from two and one half to three inches in length.

In the accompanying drawing—

Figure 3:
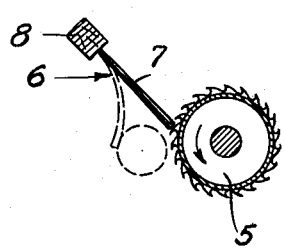
Figure 4:
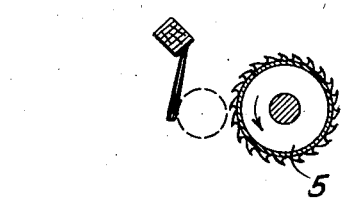

Fig. 3 is a similar view showing, in full lines, a single wire of sufficient length to permit the passage of the large foreign substance that can reach it without bending it beyond the point of elastic fatigue, the bending that occurs being practically as shown by the dotted line; and Fig. 4 is a similar view showing, by means of a single animal bristle, the permanent set away from the cylinder which will inevitably be imparted to the bristles of a brush after normal use in a machine for a greater or less length of time.

Figure 1:
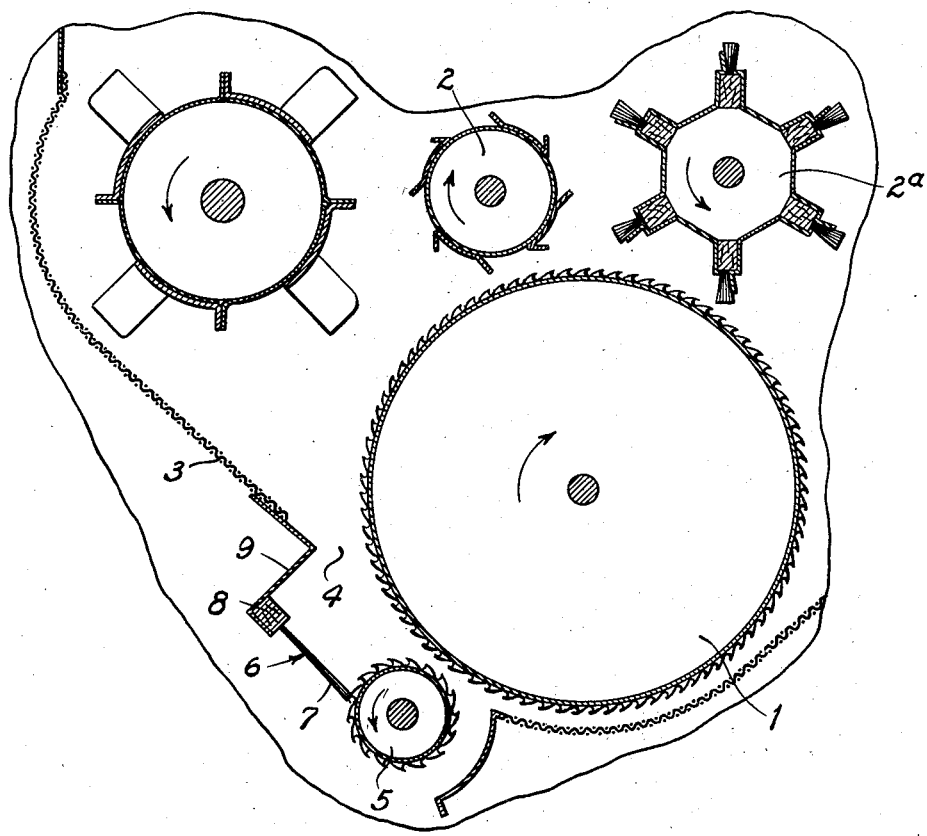
Fig. 1 illustrates in section a portion of one of my commercial extracting machines provided with my improved brush in association with the reclaiming cylinder of such machine.
Figure 2:
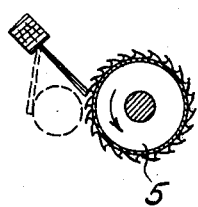
Fig. 2 is a diagrammatic illustration, showing in full lines a single wire of a brush in co-operating with a reclaiming saw cylinder, and in dotted lines how such wire, if too short for the size of foreign matter forced past it, will take a permanent set.

The wires of Figs. 1, 2 and 3, and the bristle of Fig. 4 are all assumed to exert the same elastic pressure at their free ends.

Referring now to the drawing, Fig. 1 shows a main extracting cylinder 1, a co-operating kicker roll 2 and doffer 2ª, a hull-board or cotton slide 3, a hull-discharge gap 4 between the lower end of the hull-board and the side of the extracting cylinder 1, a reclaiming saw cylinder 5 and a brush 6, composed of tempered-steel wires of the length required by my invention, associated therewith. The two cylinders and the kicker roll are rotated in the directions indicated by the arrows by conventional driving mechanism, which it is not considered necessary to illustrate. Also, it is not considered necessary to illustrate other parts of the extracting machine, as the construction and operation of such machines are well known in the art, and illustrated and described in various prior patents granted to me, of which the one named above will serve as an example.

Briefly describing the operation of the machine, cotton and hulls fed into the machine slide down the hull-board 3, the cotton being engaged by the teeth of the extracting cylinder and carried around to a doffer 2ª as usual, and the hulls and other trash escaping through the gap 4. Any hulls carried up with the cotton by the extracting cylinder are knocked back by the kicker roll 2 and eventually escape through the discharge gap. The hulls and cotton locks falling on the reclaiming saw cylinder are carried thereby under the brush 6, which forces the cotton into engagement with the teeth of the reclaiming saws while permitting the hulls to be thrown off by centrifugal action, as the pressure exerted by the brush on the hulls is not sufficient to cause the teeth of the saws to pierce the hulls.

My invention is immediately concerned with the brush 6. This brush is composed of fine tempered-steel wires 7, which are secured in bunched formation, as usual, in a backing 8, which is in the form of a bar of the length of the reclaiming cylinder and mounted in parallel relation thereto on a tranverse support 9. The free ends of wires 7, constituting the operative surface of the brush, are in line and in contact with, or very close to, the surface of the reclaiming cylinder throughout its length. The wires 7, as shown, are of considerably greater length than the width of the discharge gap 4.

It will now be readily apparent from an inspection of Figs. 1 and 3, that if a hard foreign substance, such as a stone, should fall through the gap 4, it can be carried by the reclaiming cylinder under the brush 6, the wires 7 whereof will yield to permit such movement without being bent beyond their limit of elasticity, as their length relative to the width of the gap 4 insures that no object small enough to pass through gap 4 when forced under the brush will cause the wires thereof to become permanently set or bent away from the cylinder, as would be the case with relatively short wires, as illustrated by the dotted line in Fig. 2. For the same reason, that is, the length of the wires of the brush relative to the size of any object that may be forced under them, I insure against the wires being set, or permanently bent away from the reclaiming cylinder by the hulls continuously carried thereunder by the reclaiming cylinder.

It may be stated that the use of a bristle type of brush, with bristles of a length to avoid being permanently set away from the reclaiming cylinder would be wholly impracticable; first, because the bristles would lack the strength necessary to offer the proper resistance to the passage under them of cotton to be reclaimed; and second, because the cost of longer bristles of the best quality is now prohibitive, even if their use were practicable. Animal bristles, moreover, have practically no elastic limit, and they soon lose their full measure of elasticity of flexure. That is to say, if bent only in one direction a considerable length of time, they will tend to become permanently set in that direction regardless of how little the bristles are bent. Thus, the continuous passage by the reclaiming cylinder of even comparatively small hulls or trash past the ends of the bristles will eventually set the bristles away from the cylinder, as shown by Fig. 4, although a comparatively small stone, or other foreign substance, suddenly passing the bristles would not break or permanently set the bristles, as would occur in connection with tempered-steel wires if bent beyond their elastic limit. Of course, any type of bristle brush would still be liable to damage from fire and rats, as previously pointed out.

The substitution of tempered-steel wires for bristles not only effects a considerable saving in cost, but it will be clear that, regardless of the length of the wires necessary to prevent them from being bent or set away from the reclaiming cylinder as a result of hulls or extraneous matter being carried by the reclaiming cylinder past the wires, such wires can still possess the stiffness necessary to exert the desired degree of pressure upon the cotton to insure of its being engaged by the teeth of the reclaiming saws. With the use of wire brushes, liability to damage from fire or rats is, obviously, entirely avoided.

I claim:

1. A brush for use in co-operation with the reclaiming cylinder of a cotton extracting and reclaiming machine in which machine a discharge gap permits the passage of material to the reclaiming cylinder, said brush being composed of tempered-steel wires whose point of elastic fatigue is beyond the range of critical bending pressure applied to their free ends by objects capable of passing through the discharge gap of the machine which may be forced under the brush by the reclaiming cylinder.

2. A brush for use in co-operation with the reclaiming cylinder of a cotton extracting and reclaiming machine in which machine a discharge gap permits the passage of material to the reclaiming cylinder, said brush being composed of tempered-steel wires having a degree of elastic pressure at their free ends capable of impaling locks of cotton on the teeth of the reclaiming saws, but whose critical bending point is beyond the range of bending pressure applied to their free ends by objects capable of passing through the discharge gap of the machine and which may be forced under the brush by the reclaiming cylinder.

3. In a machine of the class described providing a hull-discharge gap of a defined width past the extracting cylinder, a reclaiming cylinder located below said gap for receiving products escaping through the same, and a brush co-operating with said reclaiming cylinder composed of tempered-steel wires whose length is materially greater than the width of said gap.

4. In a cotton cleaning and reclaiming machine providing a discharge gap, in combination with a reclaiming cylinder positioned to receive products escaping through said gap, a brush co-operating therewith composed of tempered-steel wires whose length is materially greater than the width of said gap, the free ends of which lie contiguous to the periphery of said cylinder and the point of elastic fatigue of the wires relative to bending pressure applied to their free ends by objects capable of passing through said gap being further removed from the surface of the cylinder than would be the point of elastic fatigue of animal bristles having the same elastic pressure as the wires at their free ends.

5. In a machine of the class described providing a hull-discharge gap of a definite size past the extracting cylinder, a reclaiming cylinder adapted to receive products escaping through said gap, and a brush co-operating with said reclaiming cylinder composed of tempered-steel wires of greater length than the width of said gap and having a modulus of elasticity such that their free ends will exert a required degree of pressure on cotton passed beneath the brush by the reclaiming cylinder, while the wires cannot be bent beyond their limit of elasticity by the pressure of any object small enough to pass through said gap and forced beneath the brush by said cylinder.

JOHN E. MITCHELL.